United States Patent [19]
Murphy

[11] Patent Number: 5,551,877
[45] Date of Patent: *Sep. 3, 1996

[54] SYMBOLIC LANGUAGE DISPLAY SIGN UTILIZING TACTILE AND VISUAL PATTERN DISCRIMINATION

[76] Inventor: Kevin C. Murphy, 97 Forrest St., Plaistow, N.H. 03865

[*] Notice: The term of this patent shall not extend beyond the expiration date of Pat. No. 5,391,078.

[21] Appl. No.: 290,605

[22] Filed: Aug. 15, 1994

Related U.S. Application Data

[63] Continuation-in-part of Ser. No. 74,795, Jun. 10, 1993, Pat. No. 5,391,078.

[51] Int. Cl.$^6$ ................................................. G09B 21/00
[52] U.S. Cl. .................................................... 434/113
[58] Field of Search ................................. 434/112, 113; 40/622, 621, 620, 600, 585

[56] References Cited

U.S. PATENT DOCUMENTS

| | | | |
|---|---|---|---|
| 565,179 | 8/1896 | Rhodes | 434/227 |
| 1,741,669 | 12/1929 | Wilson | 40/622 |
| 1,823,130 | 9/1931 | Smith | 434/113 X |
| 5,391,078 | 2/1995 | Murphy | 434/113 |

FOREIGN PATENT DOCUMENTS 1300608  12/1972  United Kingdom ................ 40/621

*Primary Examiner*—Gene Mancene
*Assistant Examiner*—Jeffrey A. Smith
*Attorney, Agent, or Firm*—Daniel J. Bourque; Kevin J. Carroll

[57] ABSTRACT

A tactile recognition language display device includes at least one language communication segment. Each language communication segment includes a top portion having a tactilly recognizable language symbol and a side portion having a corresponding visually recognizable language symbol. The language communication segment further includes engaging members for mounting language communication segments to form words or phrases displaying a message, such as in a public place. The language communication segments of the tactile recognition language display device are removably mounted in such a way that the tactilly recognizable portion of the displayed message is easily accessible to touch by visually-impaired individuals while the visually recognizable portion of the displayed message is easily viewed. The language communication segments are removably mountable on a mounting board which may be moved to various locations for conveying the tactile and visually recognizable message.

18 Claims, 2 Drawing Sheets

SYMBOLIC LANGUAGE DISPLAY SIGN UTILIZING TACTILE AND VISUAL PATTERN DISCRIMINATION

RELATED APPLICATIONS

This Application is a continuation-in-part of U.S. Patent application Ser. No. 08/074,795, now U.S. Pat. No. 5,391,078 entitled SYMBOLIC LANGUAGE TEACHING AND COMMUNICATIONS SYSTEM UTILIZING TACTILE PATTERN DISCRIMINATION and filed Jun. 10, 1993 which is fully incorporated herein by reference.

FIELD OF THE INVENTION

This invention relates to a tactile recognition language communication device and in particular, to a tactile and visual recognition language display sign.

BACKGROUND OF THE INVENTION

In communicating by a symbolic language, such as Braille, the ability to communicate to both a visually impaired and a non-visually impaired individual is essential. In public places especially, important information displayed to the public must be recognizable by both the visually impaired and non-visually impaired alike. Tactile recognition languages, such as Braille, have been used in a very limited manner in public places such as hotels or restaurants, to aid the visually impaired in finding floors and rooms. For example, plates having Braille characters indicating room numbers or floor numbers are often fixed to walls of hallways or elevators. The difficulty of displaying Braille signs, and changing the display by non-Braille trained hotel or restaurant workers has proved to be an insurmountable problem.

Thus, prior art displays are fixed and are not easily interchangeable by both visually and non-visually impaired individuals to communicate different messages which can be recognized in public places both visually and by touch. These symbolic language displays are used when the information conveyed to the public does not have to be changed.

Devices exist which communicate tactilly recognizable characters, such as Braille characters and which can be selectably arranged to form words and phrases. However, such devices are essentially used for teaching Braille and are not suited for displaying and communicating messages in a public place. Furthermore, prior tactile recognition language devices do not communicate a visually recognizable message corresponding to the tactilly recognizable message.

Accordingly, what is needed is a tactilly and visually recognizable communication device with interchangeable characters for communicating and displaying messages to both the visually and the non-visually impaired. The characters should be positioned so that a visually impaired individual may tactilly recognize the characters and the message without moving the arranged characters. Further, the character should be arranged so that non-visually impaired individual may easily visually recognize the displayed message.

SUMMARY OF THE INVENTION

The present invention features a tactile recognition language display device for conveying tactilly and visually recognizable information. The broad concept of the present invention involves disposing tactilly recognizable language symbols on a generally horizontal portion of the display device and disposing corresponding visually recognizable language symbols on a generally vertical side portion of the display device.

In a preferred embodiment, the display device includes language communication segments and a means for mounting each language communication segment. The means for mounting the language communication segments includes an engaging member coupled to either the top, side, or bottom portion of each language communication segment, for preventing movement when the tactilly recognizable language symbol on each language communication segment is touched to be recognized.

In the preferred embodiment, the display device includes a mounting region having at least first and second generally orthogonal surfaces. In this preferred embodiment, the language communication segments have a generally "L"-shaped configuration which fits over the orthogonal surfaces of the display device mounting region so that the top portion of the language communication segment is adjacent a generally horizontal top surface of the mounting region, while a second side surface of the language communication segment is adjacent a generally vertical surface of the mounting region. Typically, the display device will include a plurality of communication segment mounting regions forming a step-like structure on which may be arranged a plurality of communication segments to form a tactilly and visually recognizable message board and message.

In one embodiment, the display device is disposed on a message board which is moveable to different locations for displaying tactilly and visually recognizable information. The message board may be supported by a vertical support member or stand so that the visually recognizable portion may be easily recognized by non-visually impaired individuals and the tactilly recognizable portion is easily accessible for touch by visually impaired individuals.

In the preferred embodiment, the engaging member of each language communication segment includes an elongated portion extending downwardly from a horizontal top portion of the language communication segment. The elongated engaging portion is received in a corresponding aperture in the horizontal surface of the mounting region of the display device so that the language segment will not move when touched. The language segment may be removed by pushing the elongated portion of the language segment upwards and out of the aperture in the mounting surface.

Each language communication segment includes a tactilly recognizable top portion which includes one or more raised protrusions arranged in a predetermined pattern to form the tactilly recognizable language symbol. In a preferred embodiment, the raised protrusion has a rounded top surface for facilitating tactile discrimination of the predetermined pattern. The language communication segments may further include or display alpha-numeric characters and each language communication segment may display one alpha-numeric character or a combination of alpha-numeric characters. Typically, the predetermined pattern forms alpha-numeric Braille characters. Each language communication segment also preferably includes a visual symbol or alpha-numeric display corresponding to the tactilly recognizable protrusions, to enable sighted individuals to be able to read the display.

DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENT

Figure 1:
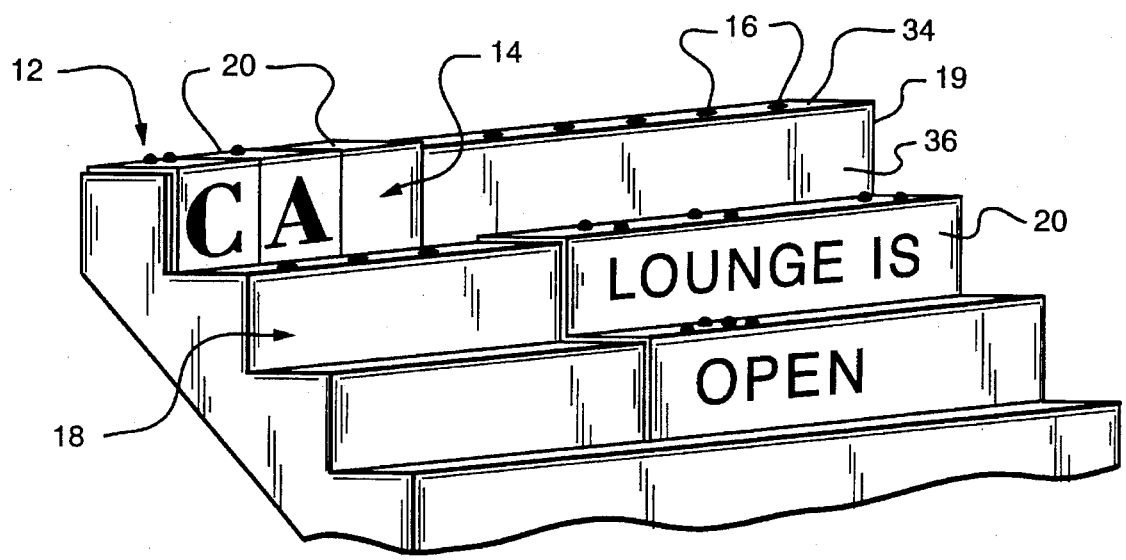
FIG. 1 is a perspective illustration of a tactile recognition language display device according to the present invention.

A tactile recognition symbolic language display device 10, FIG. 1, according to the present invention displays a message which is both visually and tactilly recognizable. The broad concept of the tactile recognition symbolic language display device according to the present invention is to display the tactilly recognizable message on a generally horizontal top region 12 and display the corresponding visually recognizable message on a generally vertical side region 14. Thus, a visually impaired individual may read the displayed message more easily by touching the horizontal surface while a non-visually impaired individual may read the displayed message more easily by viewing the message in a vertical plane.

The tactile recognition symbolic language display device 10 of the present invention forms messages using individual language communication segments or pieces 20. The language communication segments or pieces 20 are removably yet securely mounted to a mounting region 18 so that the visually impaired user may tactilly recognize the displayed message without moving or sliding the language communication segment 20. The language communication segment 20 is also mounted in such a way that the individual language communication segment 20 may be replaced or changed to form a different arrangement of characters or symbols 24, 28, thereby displaying a new message. Each language communication segment 20 could display either a portion of a message, such as a single letter, symbol or phrase, or could display an entire message, such as "LOUNGE IS OPEN", as shown in FIG. 1.

In the preferred embodiment, the mounting region 18 is formed as a step-like structure so that more than one line of information can be displayed with both tactilly and visually recognizable portions. Each language communication segment 20 is positioned adjacent a generally horizontal top surface 34 of a step 19 to display the tactilly recognizable message and adjacent a vertical side surface 36 of a step 19 to display the visually recognizable message.

Figure 2:
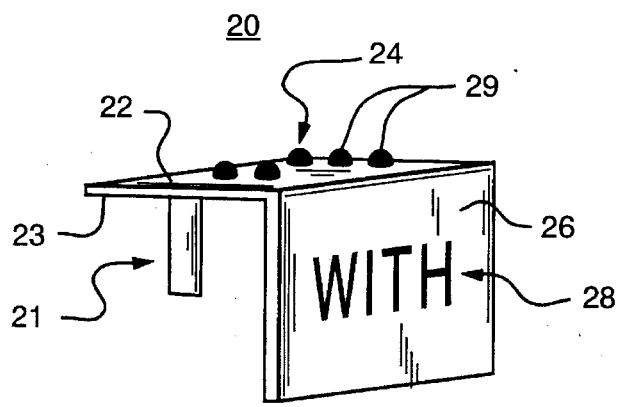
FIG. 2 is a perspective illustration of a language communication segment according to the present invention.

Each language communication segment or piece 20, FIG. 2 includes a top portion 22 having a tactilly recognizable symbol or character 24. Each language communication segment 20 further includes a side portion 26 having a visually recognizable character or symbol 28 which corresponds to the tactilly recognizable symbol or character 24. In a preferred embodiment, the language communication segment 20 has an L-shape formed by the top and side portions 22, 26. Each language communication segment 20 further includes an engaging member coupled to either the top portion 22 or side portion 26 for removably mounting or coupling the language communication segment 20 to an engaging member coupler on mounting region 18.

The top portion 22 of each language communication segment 20 includes raised protrusions 29 which are arranged to form the tactilly recognizable characters or symbols 24. In the preferred embodiment, the raised protrusions 29 have a rounded top surface as disclosed in pending patent application Ser. No. 08/074,795, incorporated herein by reference. The tactilly recognizable characters 24 are typically Braille characters and may correspond to either an individual letter, number or other symbol or may correspond to an arrangement of letters, numbers or symbols forming a phrase. The language communication segments 20 shown in FIGS. 1 and 2 have letters and words in English, but language segments may display any character or symbol in any language.

Figure 3:
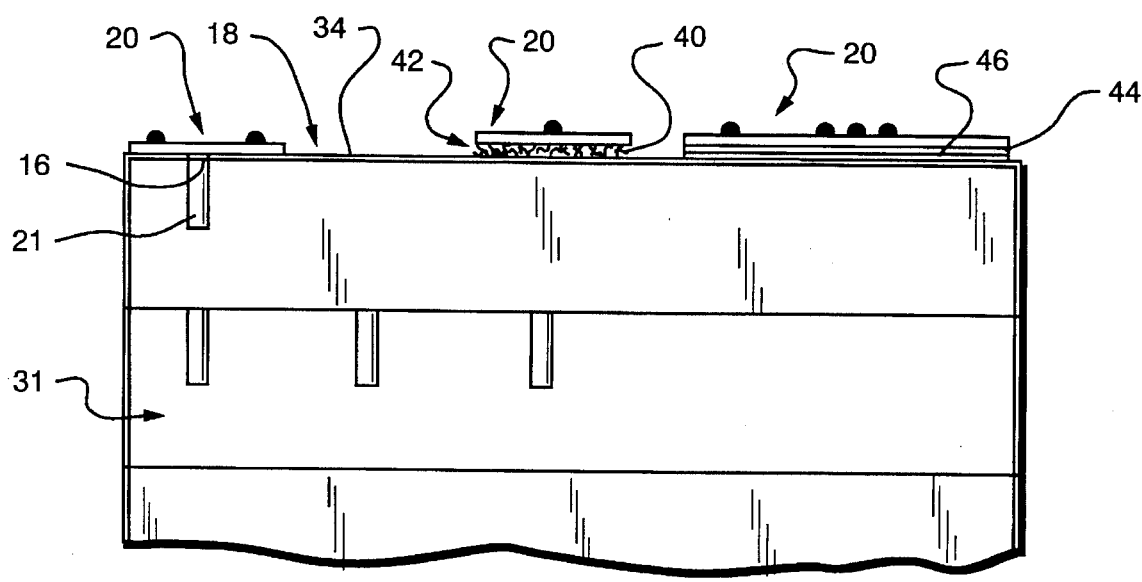
FIG. 3 is a back view of the tactile recognition language display device showing the mounting of the individual language communication segments according to the present invention.

In the preferred embodiment, the engaging member is an elongated engaging portion 21 extending downward from a bottom region 23 of the top portion 22 of the language communication segment 20. In this preferred embodiment, the language communication segments 20 are removably mounted by inserting the downwardly extending elongated engaging portion 21 into an aperture 16 in the mounting region 18, FIG. 3. Inserting the elongated engaging portion 21 of each language communication segment 20 into an aperture 16 in the generally horizontal surface 34 of mounting region 18 prevents movement of the language communication segments 20 when a visually impaired individual reads the tactilly recognizable characters from side to side. Individual language communication segments 20 are then removable by pushing the elongated engaging portion 21 of that language communication segment out of the aperture 16 from an open back region 31 of the mounting region 18.

The present invention contemplates other possible embodiments of the engaging members 21. For example, a hook/pile coupling region 40 on the language segment 20 may engage a corresponding hook/pile coupling region 42 on the mounting region 18 (not shown) or a magnetic region 44 on the language segment 20 may contact a magnetic region 46 on the mounting region 18, as disclosed in Applicant's co-pending application referenced above.

Figure 4:
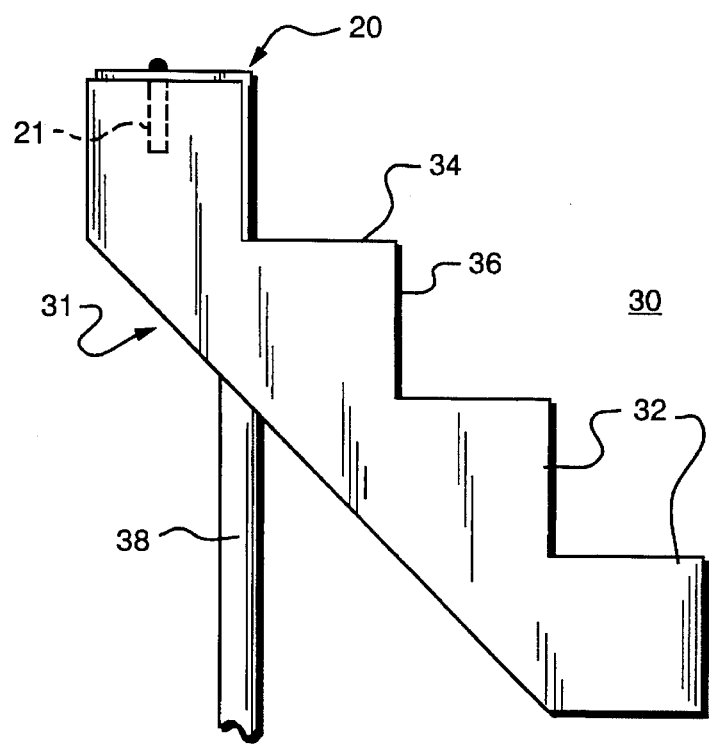
FIG. 4 is a side view of the tactile recognition language display device of the present invention supported in an upright position.

In one embodiment, the mounting region 18 is disposed on a moveable mounting board 30, FIG. 4. The mounting board 30 includes rectangular portions 32 which form steps 19. In this embodiment, the elongated engaging portions 21 extend through the top surface 34 of rectangular portions 32 and are accessible from the open back region 31 of the mounting board 30 so that the language communication segments 20 may be removed. The mounting board 30 is supported in an upright position by a support member 38, such as a stand. The support member 38 allows the tactile recognition language display device to be moved to different locations, such as in the lobby of a hotel, restaurant or other public area. In an alternative embodiment, the mounting region 18 is disposed in a wall or other fixed structure which is viewable to non-visually impaired individuals and accessible by visually impaired individuals.

Accordingly, the display device of the present invention provides tremendous flexibility in displaying information or messages to both visually impaired and non-visually impaired. The display device is interchangeable so that different messages may be displayed and is movable to a variety of locations. This device not only allows both visually impaired and non-visually impaired users to arrange the message, but also enables easy recognition of the message both tactilly and visually.

Modifications and substitutions by one of ordinary skills in the art are considered to be within the scope of the present invention which is not to be limited except by the claims which follow.

I claim:

1. A tactile recognition language display device for conveying tactilly and visually recognizable information, comprising:

at least one language communication segment including at least a first portion and a second portion, said first portion including a tactilly recognizable language symbol and said second portion including a visually recognizable language symbol corresponding to said tactilly recognizable language symbol;

at least one of said first and second portions of said at least one language communication segment including an elongated engaging member extending from said at least one of said first and second portions of said at least one language communication segment; and a mounting region, wherein said at least one language communication segment is positioned proximate said mounting region, said mounting region including at least one language communication segment engaging member aperture receiving said elongated engaging member, for generally preventing at least lateral movement of said at least one language communication segment as said tactilly recognizable symbol is recognized by touch.

2. The tactile recognition language display device of claim 1, wherein said at least one language communication segment is generally "L"-shaped.

3. The tactile recognition language display device of claim 1, wherein said mounting region includes at least first and second generally orthogonal surfaces, wherein said at least one language communication segment fits over said at least first and second generally orthogonal surfaces so that said first portion is adjacent a top one of said first and second generally orthogonal surfaces and said second portion is adjacent a side one of said first and second generally orthogonal surfaces.

4. The tactile recognition language display device of claim 1, wherein said mounting region includes a plurality of orthogonal surfaces forming a step-like structure, wherein said plurality of orthogonal surfaces are arranged so that said first portion of said at least one language communication segment is tactilly recognizable and said second portion of said at least one language communication segment is visually recognizable when said at least one language communication segment is positioned over any of said plurality of orthogonal surfaces.

5. The tactile recognition language display device of claim 1, wherein said mounting region is disposed on a mounting board, wherein said mounting board is moveable to different locations for displaying tactilly and visually recognizable information.

6. The tactile recognition language display device of claim 1, further including a plurality of language communication segments, wherein said plurality of language communication segments are arranged to form a tactilly and visually recognizable message.

7. The tactile recognition language display device of claim 1, wherein said at least a top portion of said at least one language communication segment includes at least one raised protrusion arranged in a predetermined pattern to form said tactilly recognizable language symbol.

8. The tactile recognition language display device of claim 7, wherein said at least one raised protrusion has a rounded top surface, for facilitating tactile discrimination of said predetermined pattern.

9. The tactile recognition language display device of claim 7, wherein said predetermined pattern forms a Braille character.

10. The tactile recognition language display device of claim 1, wherein said tactilly recognizable symbol and said visually recognizable symbol is an alpha-numeric character.

11. The tactile recognition language display device of claim 1, wherein said tactilly recognizable symbol and said visually recognizable symbol are a combination of alpha-numeric characters.

12. The tactile recognition language display device of claim 1, wherein said engaging member is an elongated portion extending downwardly from a top one of said first and second portions of said at least one language communication segment.

13. The tactile recognition language display device of claim 1, wherein said at least one language communication segment is removable by pushing said elongated engaging member of said at least one language communication segment upward and out of said at least one language communication segment engaging member aperture.

14. The tactile recognition language display device of claim 1, wherein said mounting region includes a vertical support member for supporting and displaying said at least one language communication segment.

15. A tactile recognition language display sign for displaying a tactilly and visually recognizable message, said tactile recognition language display sign comprising:

a plurality of stepped mounting surfaces including generally horizontal top mounting surfaces and generally vertical side mounting surfaces orthogonal to respective top mounting surfaces;

a tactilly recognizable message displayed on at least one of said top mounting surfaces, said tactilly recognizable message including a plurality of tactilly recognizable characters; and a visually recognizable message displayed on at least one of said side mounting surfaces, said visually recognizable message including a plurality of visually recognizable characters corresponding to said plurality of tactilly recognizable characters.

16. A tactile recognition language display device system for conveying tactilly and visually recognizable information, comprising:

at least one language communication segment including at least a first portion and a second portion, said first portion including a tactilly recognizable language symbol and said second portion including a visually recognizable language symbol corresponding to said tactilly recognizable language symbol;

at least one of said first and second portions of said at least one language communication segment including an elongated engaging member extending from said at least one of said first and second portions of said at least one language communication segment; and a mounting region, for removably mounting said at least one language communication segment, said mounting region including at least one language communication segment engaging member aperture, for receiving said elongated engaging member, and for generally preventing movement of said at least one language communication segment as said tactilly recognizable symbol is recognized by touch.

17. A tactile recognition language display device for conveying tactilly and visually recognizable information, comprising:

at least one language communication segment including:
- a first portion disposed substantially in a first plane, said first portion including a tactilly recognizable language symbol;
- a second portion extending from at least one edge of said first portion and disposed substantially in a second plane orthogonal to said first plane, said second portion including a visually recognizable symbol corresponding to said tactilly recognizable symbol;
- at least first and second open side regions, wherein said first open side region is disposed opposite said second open side region so that said at least one language communication segment is adapted to be positioned over at lease a portion of at least first and second orthogonal surfaces with said first portion positioned substantially flat against said first orthogonal surface and said second portion positioned substantially flat against said second orthogonal surface; and
- a mounting device engaging member, extending from at least one of said first and second portions.

18. The tactile recognition language display of claim 17, wherein said engaging member includes one of a magnetic region and a hook/pile region.

* * * * *